US011970357B1

(12) United States Patent
Liang et al.

(10) Patent No.: US 11,970,357 B1
(45) Date of Patent: Apr. 30, 2024

(54) TENSION CONTROL METHOD OF MULTI-BUNDLE WINDING EQUIPMENT COMBINED DRIVING SYSTEM

(71) Applicant: Taiyuan University of Technology, Taiyuan (CN)

(72) Inventors: Jianguo Liang, Taiyuan (CN); Qingxue Huang, Taiyuan (CN); Yujie Duan, Taiyuan (CN); Xinyu Wen, Taiyuan (CN); Lianyun Jiang, Taiyuan (CN); Chunjiang Zhao, Taiyuan (CN); Xiaodong Zhao, Taiyuan (CN); Yinhui Li, Taiyuan (CN); Haifeng Gao, Taiyuan (CN); Jianglin Liu, Taiyuan (CN)

(73) Assignee: TAIYUAN UNIVERSITY OF TECHNOLOGY, Taiyuan (CN)

( * ) Notice: Subject to any disclaimer, the term of this patent is extended or adjusted under 35 U.S.C. 154(b) by 0 days.

(21) Appl. No.: 18/501,276

(22) Filed: Nov. 3, 2023

(30) Foreign Application Priority Data

Feb. 27, 2023 (CN) .......................... 202310167978.6

(51) Int. Cl.
B65H 59/10 (2006.01)
G05B 15/02 (2006.01)

(52) U.S. Cl.
CPC ............. *B65H 59/10* (2013.01); *G05B 15/02* (2013.01); *B65H 2557/24* (2013.01)

(58) Field of Classification Search
CPC ..... B65H 59/10; B65H 2557/24; G05B 15/02
See application file for complete search history.

(56) References Cited

U.S. PATENT DOCUMENTS 8,403,251 B2 * 3/2013 Uozumi .............. B29C 53/8016
242/151
9,958,839 B2 * 5/2018 Li .......................... G05B 11/36
(Continued)

FOREIGN PATENT DOCUMENTS

CN 109709799 A 5/2019

OTHER PUBLICATIONS

First Office Action and Search Report issued in Chinese Application No. 202310167978.6; mailed Apr. 4, 2023; 20 pgs.
(Continued)

*Primary Examiner* — Ramesh B Patel
(74) *Attorney, Agent, or Firm* — HAUPTMAN HAM, LLP (57) ABSTRACT

The present application relates to the technical field of fiber winding control, and provides a tension control method of a multi-bundle winding equipment combined driving system, which solves the problem that the tension fluctuates greatly and cannot be output constantly in the fiber winding process. The method includes: establishing a tension control system fractional order mathematical model; establishing a time-varying fractional order PID controller; inputting a target tension value and an unknown external interference to the tension control system fractional order mathematical model, and outputting a real-time tension value; and calculating a difference between the target tension value and the real-time tension value and then inputting the difference into the time-varying fractional order PID controller, inputting an output value of the time-varying fractional order PID controller and the unknown external interference into the tension control system fractional order mathematical model, and outputting a real-time tension value until the real-time tension value output by the tension control system fractional order mathematical model approaches the target tension (Continued)

value. The tension value output by the control system according to the present application can be well stabilized near the target tension value; and the system has high robustness when the tension changes suddenly.

1 Claim, 5 Drawing Sheets

(56) References Cited

U.S. PATENT DOCUMENTS

| | | | | |
|---|---|---|---|---|
| 10,118,792 | B2 * | 11/2018 | Grossman | B65H 49/26 |
| 10,361,802 | B1 * | 7/2019 | Hoffberg-Borghesani | |
| | | | | G06F 3/00 |
| 10,936,770 | B2 * | 3/2021 | Zhang | H02P 23/00 |
| 2009/0314872 | A1 * | 12/2009 | Uozumi | B29C 53/8016 |
| | | | | 242/410 |
| 2021/0229946 | A1 * | 7/2021 | Knierim | B65H 59/385 |
| 2022/0119215 | A1 * | 4/2022 | Rappel | B65H 23/1955 |

OTHER PUBLICATIONS

Notification to Grant Patent Right for Invention issued in Chinese Application No. 202310167978.6; mailed Apr. 18, 2023; 6 pgs.

* cited by examiner

TENSION CONTROL METHOD OF MULTI-BUNDLE WINDING EQUIPMENT COMBINED DRIVING SYSTEM

RELATED APPLICATIONS

The present application claims priority from Chinese Application Number 202310167978.6, filed Feb. 27, 2023, the disclosure of which is hereby incorporated by reference herein in its entirety.

TECHNICAL FIELD

The present application belongs to the technical field of fiber winding equipment, and in particular, relates to a tension control method of a multi-bundle winding equipment combined driving system.

BACKGROUND

Winding equipment is widely applied to the industries such as preparation containers, manufacturing of material storage containers, automobiles and aerospace. Fiber winding is mainly to cover a surface of a wound piece with fiber materials uniformly in a certain winding manner, which is a processing technology for improving the performance of products. Traditional fiber winding equipment mainly adopts single-bundle winding, and to improve the efficiency, a multi-station single-bundle winding device is continuously developed. However, a control system of the winding equipment has low automation degree and low winding efficiency. The winding control system is simple and vulnerable to external interferences, and has a weak capability of controlling the tension constant.

With the birth of multi-bundle winding equipment, multi-bundle spiral hoop winding equipment can open up a broad development space for a fiber winding process. A multi-bundle spiral winding process and a hoop winding process can improve the fiber winding efficiency and reduce the winding defect, and can improve the performance of products while reducing the use amount of fiber. For little research on the development of a control system of the multi-bundle winding equipment at present, the control problem of multi-bundle winding is multi-axis and multi-equipment cooperative control, which puts forward higher requirements on the synchronicity, real-time performance and high precision of the control system. The control of a multi-axis linkage system involved in multi-bundle winding becomes indispensable to a flexible manufacturing system.

In the fiber winding and forming process of a composite material, the control of a winding tension is an important link. Too large tension will lead to broken yarns of the fiber and deformation of a mandrel. Too small tension will lead to low product strength and serious yarn slippage phenomenon of the fiber. The tension fluctuation will lead to low compactness and non-uniform glue content of winding products, thereby seriously affecting the performance of the products. The main objective in the industrial practical production application is to ensure the stable winding tension of the whole production process as much as possible. In the control aspect of the tension control system, since the tension control system has the characteristics of high real-time performance, multiple parameters and non-linearity, in the fiber winding tension control system, fiber winding serves as a flexible production line, due to the diversity of the winding line type and the mandrel, the control difficulty of the fiber tension is increased. Due to the sharp change of the mandrel shape and the interference of the external environment, the yarn outlet speed of the fiber will change at a high acceleration, so that the fiber generates a large tension deviation within a short time, and a controller and a method with higher dynamic response performance and robustness are required.

SUMMARY

To solve at least one of the above technical problems in the prior art, the present application provides a tension control method of a multi-bundle winding equipment combined driving system.

The present application is implemented by the following technical solution: a tension control method of a multi-bundle winding equipment combined driving system includes the following steps:

S1: establishing a tension control system fractional order mathematical model according to an unwinding roll moment equation, a swing rod speed difference equation and a circuit equation, S2: introducing a time-varying parameter into fractional order PID control, and establishing a time-varying fractional order PID controller, S3: setting a target tension value r(t), inputting the target tension value r(t) and an unknown external interference Δd into the tension control system fractional order mathematical model, and outputting a real-time tension value y(t);

S4: calculating a difference between the target tension value r(t) and the real-time tension value y(t) and then inputting the difference into the time-varying fractional order PID controller, and outputting $u_{SC}$ by the time-varying fractional order PID controller;

S5: inputting an output value $u_{SC}$ of the controller and the unknown external interference Δd into the tension control system fractional order mathematical model, and outputting a real-time tension value y(t); and S6: repeating steps S4 and S5 until the real-time tension value y(t) output by the tension control system fractional order mathematical model approaches the target tension value r(t).

Preferably, a transfer function G(s) of the tension control system fractional order mathematical model is:

$$G(s) = G_a(s)G_b(s) = \frac{a}{bs^\alpha + 1} \cdot \frac{c}{s^\sigma}$$

in the formula, $G_a(s)$ is a fractional order transfer function of an unwinding roll module of a tension control system, $G_b(s)$ is a fractional order transfer function of a swing rod module of the tension control system, $$a = \frac{K_t}{BR + K_e K_t},$$

$K_t$ is a torque constant of a tension servo motor, B is a total friction coefficient converted to a motor shaft of the tension servo motor, R is an equivalent resistance, $K_e$ is a back electromotive force coefficient, $$b = \frac{JR}{BR + K_e K_t},$$

J is a total rotational inertia, $$c = \frac{1}{2L_B},$$

$L_B$ is a half of a length of the swing rod, α is an introduced differential operator and 0<α<2, σ is an introduced integral operator and 0<σ<2.

Preferably, a transfer function $G_k(s)$ of the time-varying fractional order PID controller is:

$$G_k(s) = K_p + \frac{K_i}{s^\lambda} + K_d s^\mu$$

in the formula, $K_p$ is a proportionality coefficient of the time-varying fractional order PID controller, $K_i$ is an integral coefficient of the time-varying fractional order PID controller, $K_d$ is a differential coefficient of the time-varying fractional order PID controller, λ is an integral operator of the time-varying fractional order PID controller and 0<λ<2, μ is a differential operator of the time-varying fractional order PID controller and 0<μ<2.

Preferably, a setting rule of the proportionality coefficient $K_p$, the integral coefficient $K_i$ and the differential coefficient $K_d$ of the time-varying fractional order PID controller is as follows:

$$K_p = m \cdot f^2(t), K_i = n \cdot f^3(t), K_d = p \cdot f(t)$$

In the formula, m, n, p is an adjustable parameter and m, n, p∈ [0,100], f(t) is an adjusting formula, an expression of the adjustment formula f(t) is as follows:

$$f(t) = \zeta \cdot (1 - e^{-t})$$

In the formula, ζ is determined according to a time behavior of a controlled system and has a value range of (1<ζ<100), and e is a natural constant.

Compared with the prior art, the present application has the following beneficial effects: by establishing the more accurate tension control system fractional order mathematical model and time-varying fractional order PID controller, the present application has the following advantages: the dynamic response capability, the robustness and the tension output precision of the tension control system can be improved, the vibration amplitude of the tension output value can be reduced obviously and can rapidly return to a stable state, the final tension value can be stabilized near the target tension value well, and the problem of constant tension control during winding can be solved.

According to the present application, the automatic control of the winding tension on the wound piece can be completed, the winding efficiency can be improved, high-accuracy control can be realized, the process requirement can be met better, the cooperative control capability of the system can be improved, and the control system has higher universality.

BRIEF DESCRIPTION OF THE DRAWINGS

To describe the technical solutions in the embodiments of the present application or in the prior art more clearly, the accompanying drawings required for the embodiments will be briefly described below. Apparently, the accompanying drawings in the following description show merely some embodiments of the present application, and a person of ordinary skill in the art may still derive other accompanying drawings from these accompanying drawings without creative efforts.

In the drawings: 1. six-degree-of-freedom mechanical arm; 2. spiral winding device; 3. hoop winding device; 4. carrying cart; 5. movable sliding rail; 6. wound piece.

DETAILED DESCRIPTION OF THE EMBODIMENTS

The technical solutions in the embodiments of the present application are described clearly and completely with reference to the accompanying drawings in the embodiments of the present application. Apparently, the described embodiments are merely some rather than all of the embodiments of the present application. All other embodiments obtained by a person of ordinary skill in the art based on the embodiments of the present application without creative efforts should fall within the protection scope of the present application.

It should be noted that the structure, scale, size and the like shown in the drawings of the specification are only used to cooperatively describe the content disclosed by the specification for those skilled in the art to understand and read, and are not intended to limit the implementation of the present application. Therefore, it has no technical substantive significance. Any structural modification, change of a scale relationship or adjustment of size should still fall within the scope which can be covered by the technical content disclosed by the present application without affecting the effects and the objective achieved by the present application. It should be noted that in this specification, relationship terms such as first and second are only used to distinguish one entity from several other entities, and do not necessarily require or imply the presence of any such actual relationship or sequence between these entities.

Figure 1:
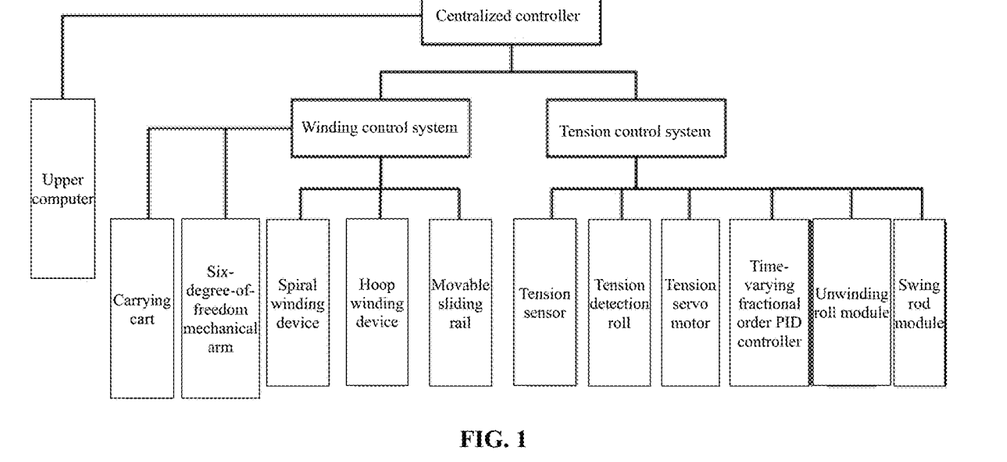
FIG. 1 is a main control function module diagram of a combined driving system according to the present application.
Figure 2:
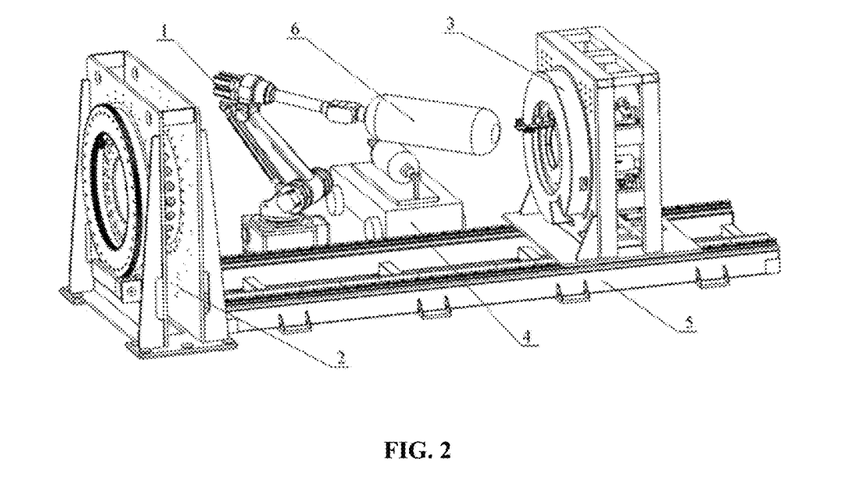
FIG. 2 is an equipment schematic diagram of a combined driving system according to the present application.

The present application provides an embodiment:

as shown in FIG. 1 and FIG. 2, a multi-bundle winding equipment combined driving system includes a six-degree-of-freedom mechanical arm 1, a spiral winding device 2, a hoop winding device 3, a controller, an upper computer, a wound piece 6, a tension control system, a carrying cart 4 and a movable sliding rail 5, where the six-degree-of-freedom mechanical arm 1 is configured to grab, clamp, feed and return the wound piece 6; the spiral winding device 2 is configured to spirally wind the wound piece 6; the hoop winding device 3 is configured to perform hoop winding on the wound piece 6; the controller is configured to receive a control instruction sent by the upper computer and transmit the control instruction to a corresponding performing mechanism; the upper computer is configured to set a parameter of the performing mechanism, set a target tension value and perform analogue simulation on a tension control system model; the carrying cart 4 is configured to transport the wound piece 6; the movable sliding rail 5 is configured to horizontally slide the spiral winding device 2 or the hoop winding device 3; upper computer software is Matlab, CAD-WIND, Abaqus and other simulation systems;

the tension control system includes an unwinding roll module, a swing rod module, a tension detection roll, a tension servo motor, a tension sensor and a time-varying fractional order PID controller; the tension sensor is configured to perform real-time detection on the tension; and the unwinding roll module, the swing rod module and the time-varying fractional order PID controller are configured to compensate an output moment of the tension servo motor according to a deviation value of the tension to stably output the tension.

Figure 6:
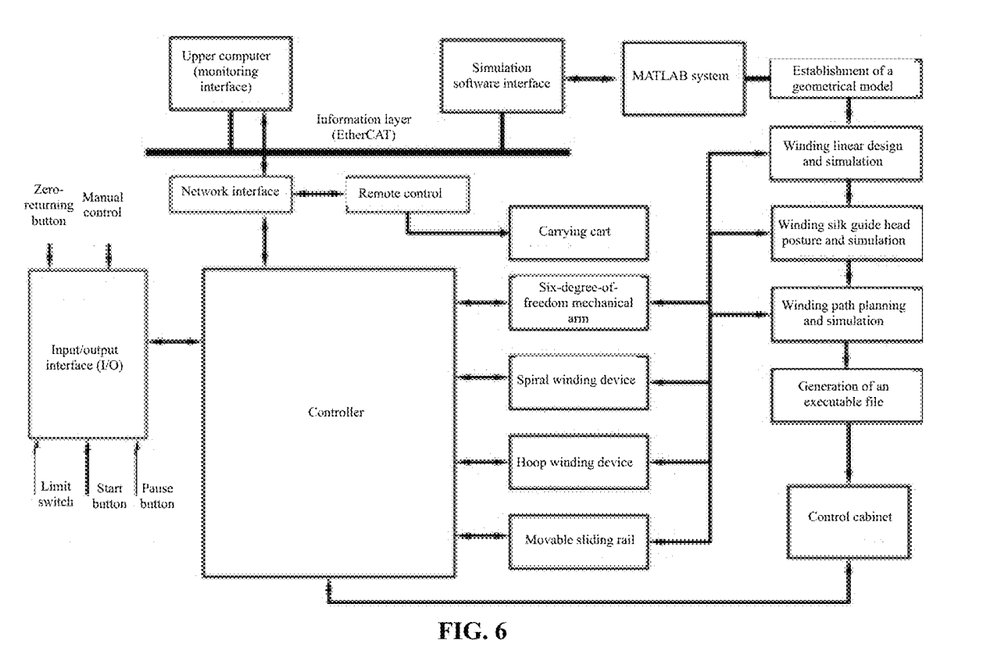
FIG. 6 is a schematic diagram of a multi-bundle equipment combined driving control system according to the present application.
Figure 7:
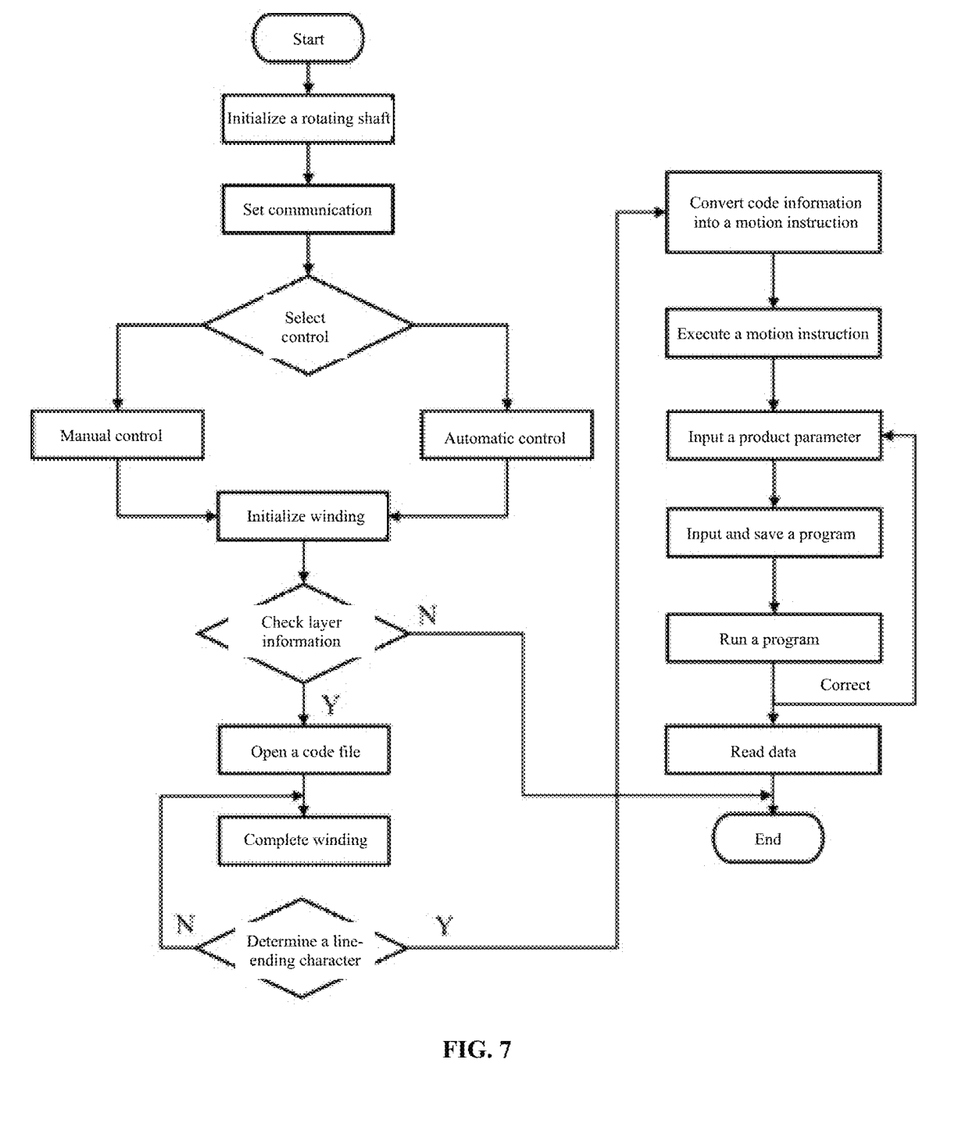
FIG. 7 is a program design flowchart of a whole control system according to the present application.

As shown in FIG. 6 and FIG. 7, the control system software adopts modular program structure design, and the written program communicates with other modules through interfaces; and spiral and hoop winding parameters are designed according to the size of the wound piece 6, and the function of the program is realized through communication and mutual call between the modules.

The combined driving control system has two control modes: a manual control mode and an automatic control mode. In the manual mode, each device system controls operation independently; and in the automatic working mode, each device system cooperates with each other to complete the transportation, spiral winding and hoop winding of the wound piece 6. In this process, the tension control system ensures that the tension of the winding yarn tends to be constant, and adjusts the yarn feeding and returning actions, thereby avoiding yarn twisting in the winding process and the yarn slippage and breakage caused by the fluctuation and sudden change of the tension. Meanwhile, the controller may control the movement of the corresponding servo motor to adjust the winding line type and angle.

After the controller is powered on, the internal program is automatically executed, each degree-of-freedom rotating shaft of the multi-bundle winding equipment is initialized according to the set rotating shaft parameter of the upper computer, and communication connection with the upper computer is established after the program of the operation equipment is initialized. However, the system will display an error when connection is unsuccessful, and the manual or automatic control model may be selected for winding after communication connection is successful.

In the automatic control mode, the winding motion is started, the system variable is initialized, and motion parameter information is recorded at the same time in the automatic winding process. Then, the upper computer checks whether the currently executed code file is consistent with the preset parameter of the winding software of the upper computer. If the currently executed code file is inconsistent with the preset parameter of the winding software of the upper computer, the upper computer is returned and an error is reported. If the currently executed code file is consistent with the preset parameter of the winding software of the upper computer, the code file is opened and read for cyclic determination of statements. When a terminator is read, the program is read, and the read code information is converted into a motion instruction. In combination with the input product size and position parameter, the motion instruction is transmitted to the six-degree-of-freedom mechanical arm 1, the spiral winding device 2, the hoop winding device 3, the carrying cart 4 and the movable sliding rail 5 to control the motion of the combined driving system to complete the winding action of the wound piece 6.

Different winding tensions are applied to different winding sections according to the process requirements, and different spiral and hooping winding modes require different applied tensions. In this embodiment, the target tension value r(t) is related to the winding mode of the fiber and the position of a spinning nozzle on the surface of the wound piece 6. When the winding mode is the spiral winding, the target tension value r(t) corresponding to a seal head section of the wound piece 6 wound by the spinning nozzle is a first preset value, the target tension value r(t) corresponding to a cylinder body section of the wound piece 6 wound by the spinning nozzle is a second preset section, and the first preset value is greater than the second preset value. When the winding mode is the hoop winding, the target tension value r(t) corresponding to the cylinder body section of the wound piece 6 wound by the spinning nozzle is a third preset value.

Specifically, according to the trajectory coordinates of the spinning nozzle on the surface of the wound piece 6, it is determined that the winding position is at the seal head section or the cylinder body section by determining the real-time trajectory point and in combination with the position coordinates of the wound piece 6, so that the corresponding target tension value is given. This kind of positioning method is the prior art, which is not elaborated herein.

Figure 3:
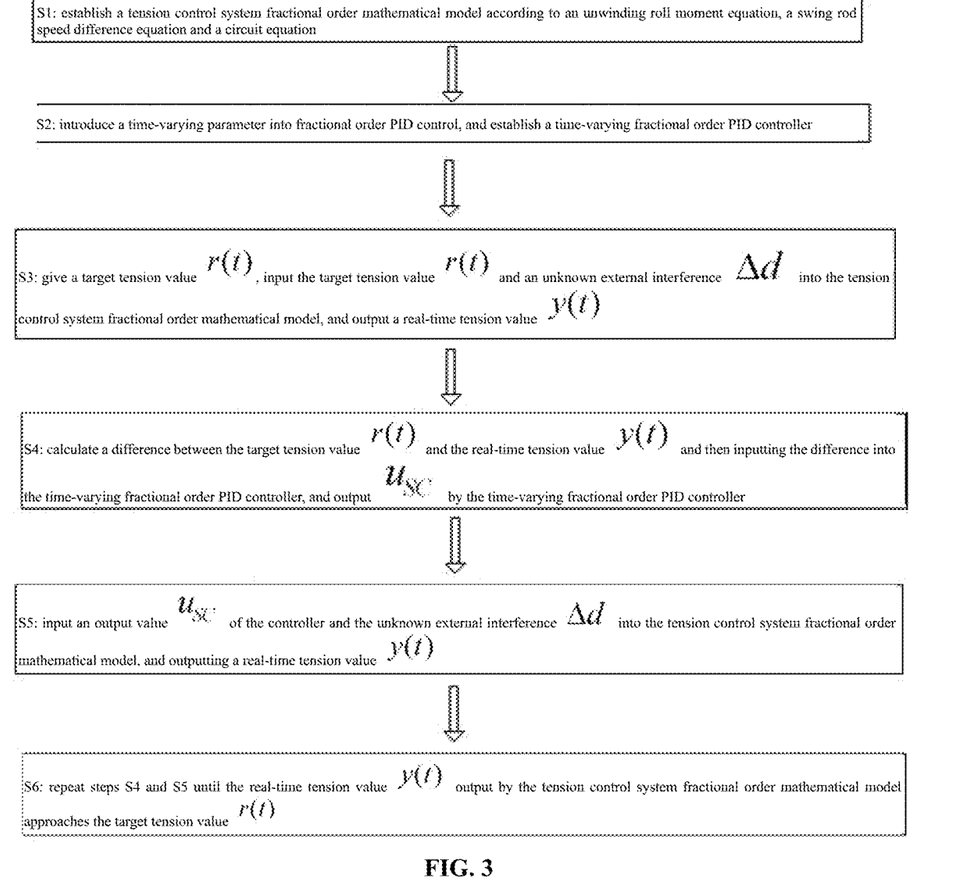
FIG. 3 is a control flowchart of a tension control system according to the present application.
Figure 4:
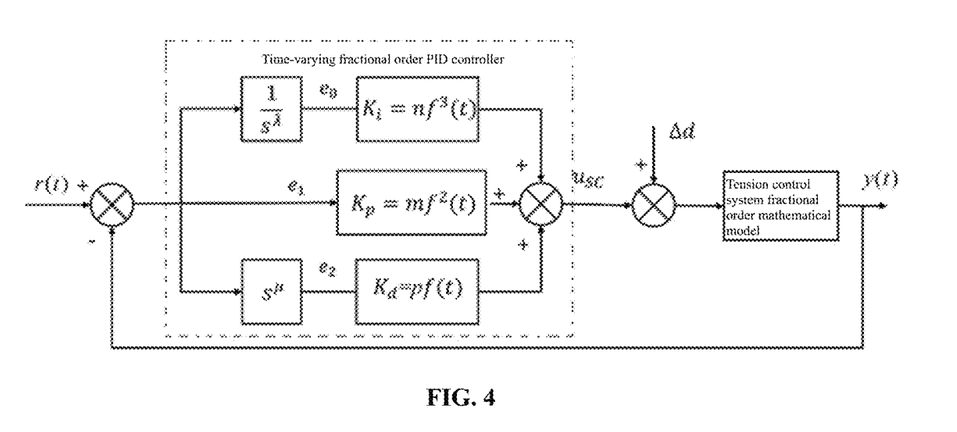
FIG. 4 is a control schematic diagram of a tension control system according to the present application.

As shown in FIG. 3 and FIG. 4, the present application provides a tension control method of a multi-bundle winding equipment combined driving system, depending on the multi-bundle winding equipment combined driving system and including the following steps:

S1: establish a tension control system fractional order mathematical model according to an unwinding roll moment equation, a swing rod speed difference equation and a circuit equation, S2: introduce a time-varying parameter into fractional order PID control, and establish a time-varying fractional order PID controller;

S3: set a target tension value r(t), input the target tension value r(t) and an unknown external interference $\Delta d$ into the tension control system fractional order mathematical model, and output a real-time tension value y(t);

S4: calculate a difference between the target tension value r(t) and the real-time tension value y(t) and then input the difference into the time-varying fractional order PID controller, and output $u_{SC}$ by the time-varying fractional order PID controller;

S5: input an output value $u_{SC}$ of the controller and the unknown external interference $\Delta d$ into the tension control system fractional order mathematical model, and output a real-time tension value y(t); and S6: repeat steps S4 and S5 until the real-time tension value y(t) output by the tension control system fractional order mathematical model approaches the target tension value r(t).

In step S1, the establish a tension control system fractional order mathematical model includes:

the mechanical property of the unwinding roll and the swing in the fiber winding process is analyzed, where the tension model has non-linearity and multi-parameter time variation in the fiber winding process; and a transfer function of the tension control system fractional order mathematical model is obtained according to an unwinding dynamic roll moment equation, a tension servo motor circuit equation and the swing rod speed difference equation, where the unwinding roll dynamic moment balance equation is shown in a formula (1):

$$M(t) - T(t)R(t) = J(t)\frac{d^\alpha \omega(t)}{dt^\alpha} + B\omega(t) \quad (1)$$

the servo motor circuit equation is shown in a formula (2):

$$u_c(t) = Ri_c + L\frac{d^\beta i_c(t)}{dt^\beta} + K_e \cdot \omega(t) \quad (2)$$

the swing rod speed difference equation is shown in a formula (3):

$$\theta = \frac{1}{2L_B} D^{-\sigma}(v_2 - v_1) = \frac{1}{2L_B} \int_0^{t_0} {}^{(\sigma)}(v_2 - v_1) dt \quad (3)$$

In the formulas (1), (2) and (3), $M(t)$ is an output moment of the tension servo motor and $M(t)=K_t \cdot i_c(t)$; $R(t)$ is a coil radius of the unwinding roll; $\omega(t)$ is a rotational angle speed of the tension servo motor; $K_t$ is a torque constant of the tension servo motor; $e_v$ is a back electromotive force of the tension servo motor; $K_e$ is a back electromotive force coefficient; $B$ is a total friction coefficient converted to a motor shaft of the tension servo motor; $J$ is a total rotational inertia; $u_c$ is an armature voltage; $R$ is an equivalent resistance; $i_c$ is an armature current; $L$ is an inductance coefficient; $T(t)$ is a real-time tension; $L_B$ is a half of a length of the swing rod; $\theta$ is a swing angle of the swing rod; and $v_1$ is a fiber input speed of a yarn feeding end; $v_2$ is a fiber output speed of a yarn outlet end. To approximate the actual physical process, differential operators $\alpha$ and $\beta$, and an integral operator $\sigma$ are introduced, and $0<\alpha<2$, $0<\beta<2$, and $0<\sigma<2$, where $\alpha$, $\beta$ and $\sigma$ may be valued according to the characteristic (non-linearity) of the actual physical system.

The formula (1) and the formula (2) are combined for Laplace change to obtain a formula (4):

$$W(s) = \frac{K_t}{(Js^\alpha + B)(Ls^\beta + R) + K_e K_t} U_c(s) \quad (4)$$

The formula (3) is subjected to Laplace change to obtain a formula (5):

$$\theta(s) = \frac{1}{2L_B} \cdot \frac{1}{s^\sigma} v(s) \quad (5)$$

In the formula, $v(s)=v_2-v_1$.

In a case that dry friction and viscous friction are omitted, the unit of the inductance coefficient L is milliampere, the influence of the inductance coefficient (L≈0) may be omitted, and fractional order transfer functions of the unwinding roll module and the swing rod module of the tension control system are obtained and shown in a formula (6) and a formula (7):

$$G_a(s) = \frac{W(s)}{U_c(s)} = \frac{K_t}{JRs^\alpha + BR + K_e K_t} \quad (6)$$

$$G_b(s) = \frac{\theta(s)}{v(s)} = \frac{1}{2L_B} \cdot \frac{1}{s^\sigma} \quad (7)$$

The tension control system fractional order mathematical model includes the unwinding roll module and the swing rod module which are connected in series. A transfer function of the tension control system fractional order mathematical model is shown in a formula (8):

$$G(s) = G_a(s)G_b(s) = \frac{a}{bs^\alpha + 1} \cdot \frac{c}{s^\sigma} \quad (8)$$

where $$a = \frac{K_t}{BR + K_e K_t}, \quad b = \frac{JR}{BR + K_e K_t} \text{ and } c = \frac{1}{2L_B}.$$

Figure 5:
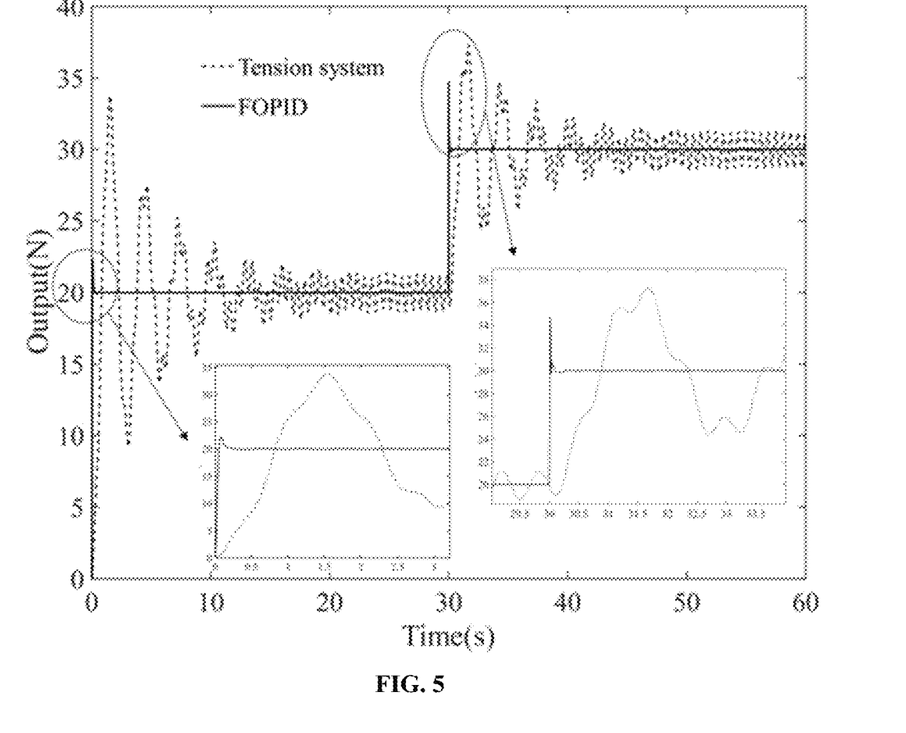
FIG. 5 is an output curve diagram of a tension control system according to the present application.

The obtained transfer function of the tension control system fractional order mathematical model is simulated by a FOMCON toolbox in matlab or simulink to obtain a system tension output curve under the setting of constant tension input, as shown in FIG. 5.

A nominal model of the system is obtained by a system identification method, the fractional order integral-differential operator is introduced into the tension control system mathematical model, and a tension control mathematical model with the non-linear characteristic is established, thereby fitting a tension output curve and representing the actual tension process more accurately.

In step S2, by adoption of a method for introducing a time-varying parameter in the fractional order PID control, in the tension control system, a relationship among parameters $\lambda$, $\mu$, Kp, Ki and Kd is established for the fractional order PID controller, and a time-varying fractional order PID controller is provided.

Taking a tension roll sensor in a winding tension control system as a feedback object, the principle of adjusting the tension is as follows: a real-time tension value $y(t)$ is compared with a target tension value $r(t)$; and when a deviation value occurs, torque compensation is performed after time-varying fractional order PID control adjustment, and the tension is adjusted by the torque of the tension servo motor.

A transfer function $G_k(s)$ of the time-varying fractional order PID controller is:

$$G_k(s) = K_p + \frac{K_i}{s^\lambda} + K_d s^\mu \quad (9)$$

In the formula, $K_p$ is a proportionality coefficient of the time-varying fractional order PID controller, $K_i$ is an integration coefficient of the time-varying fractional order PID controller, $K_d$ is a differential coefficient of the time-varying fractional order PID controller, $\lambda$ is an integral operator of the time-varying fractional order PID controller and $0<\lambda<2$, $\mu$ is a differential operator of the time-varying fractional order PID controller and $0<\mu<2$.

The output of the time-varying fractional order PID controller is shown in a formula (10):

$$u_{SC}(t) = K_p e_1(t) + K_i \frac{d^{-\lambda} e_1(t)}{dt^{-\lambda}} + K_d \frac{d^\mu e_1(t)}{dt^\mu} \quad (10)$$

The input of the time-varying fractional order PID controller is shown in formula (11):

$$e_1(t) = r(t) - y(t) \quad (11)$$

A setting rule of three parameters such as the proportionality coefficient $K_p$, the integral coefficient $K_i$ and the differential coefficient $K_d$ of the time-varying fractional order PID controller is shown in a formula (12):

$$K_p = m \cdot f^2(t), \ K_i = n \cdot f^3(t) \text{ and } K_d = p \cdot f(t) \quad (12)$$

An adjustment formula f(t) is shown in a formula (13):

$$f(t) = \zeta \cdot (1 - e^t) \quad (13)$$

In the formulas (10), (11), (12) and (13), r(t) is a target tension value; y(t) is a real-time value; $e_1(t)$ is a real-time tension deviation value; $u_{SC}(t)$ is a controller output; m, n and p are adjustable parameters, and m, n, p∈ [0,100]; and $\zeta$ is determined by a time behavior of a controlled system, and has a value range is (1<$\zeta$<100).

In steps S3, S4 and S5, the tension control principle is as follows: under the condition that the target tension value r(t) is given, the parameters m, n and p are selected by the time-varying fractional order PID controller, so that the real-time tension value y(t) output by the tension control system gradually approaches the target tension value r(t), that is, $$\lim_{t \to \infty} e_1(t) = r(t) - y(t) = 0,$$

the shorter the adjusting time t is, the higher the control dynamic response performance is, and the better the control effect is.

The state space expression of the tension control system fractional order under a time domain is shown in a formula (14):

$$\begin{cases} \frac{d^\alpha y_1(t)}{dt^\alpha} = \frac{a}{b} u_{SC}(t) - \frac{1}{b} y_1(t) + \Delta d(t) \\ \frac{d^\sigma y_2(t)}{dt^\sigma} = c y_1(t) \\ y(t) = y_2(t) \end{cases} \quad (14)$$

where $u_{SC}(t)$ is a controller output; y(t) is a real-time tension value; $\Delta d$ is an unknown external interference;

$$a = \frac{K_t}{BR + K_e K_t}, \ b = \frac{JR}{BR + K_e K_t}, \text{ and } c = \frac{1}{2L_B};$$

$y_1(t)$ is an output of the unwinding roll module of the tension control system; and $y_2(t)$ is an output of the swing rod module of the tension control system, that is, a real-time tension value.

The formula (10) and the formula (12) are combined to obtain a formula (15):

$$u_{SC}(t) = m \cdot f^2(t) \cdot e_1(t) + n \cdot f^3(t) \cdot \frac{d^{-\lambda} e_1(t)}{dt^{-\lambda}} + p \cdot f(t) \cdot \frac{d^\mu e_1(t)}{dt^\mu} \quad (15)$$

The formula (15) is put into the formula (14) to obtain:

$$\frac{d^{\alpha+\sigma} y(t)}{dt^{\alpha+\sigma}} = \frac{a \cdot c}{b} \left[ m \cdot f^2(t) \cdot e_1(t) + n \cdot f^3(t) \cdot \frac{d^{-\lambda} e_1(t)}{dt^{-\lambda}} + p \cdot f(t) \cdot \frac{d^\mu e_1(t)}{dt^\mu} \right] - \frac{1}{b} \frac{d^\sigma y(t)}{dt^\sigma} + c \cdot \Delta d(t)$$

the time-varying fractional order PID controller is designed for the tension control of the fiber bundle, and f(t) is added to the parameter setting of the controller, so that the system has higher dynamic response performance and robustness, the tension output precision can be improved, and the tension output stability can be ensured.

In FIG. 7, r(t) is a reference input (a target tension value), and y(t) is a system output (a real-time tension value), where the real-time tension deviation value is $e_1(t) = r(t) - y(t)$, the error integral is $$e_0 = \frac{d^{-\lambda} e_1(t)}{dt^{-\lambda}},$$

and the error differential is $$e_2 = \frac{d^\mu e_1(t)}{dt^\mu}, \ 0 < \lambda < 2 \text{ and } 0 < \mu < 2.$$

$u_{SC}(t)$ is a controller output. When there is an interference $\Delta d$ in the system, as shown in dotted lines in FIG. 5, when the set target tension value is 20 N, a large vibration phenomenon occurs in the tension output of the original tension control system firstly, and after 20 s, the tension output is stabilized within a certain range, and vibration is performed according to a certain frequency. When the target tension value is suddenly changed from 20 N to 30 N, a large vibration phenomenon occurs in the original tension control system, it takes a long time for the system to recover to a stable state, and the system robustness and recovery capability are low.

As shown in solid lines in FIG. 5, under the action of the time-varying fractional order PID controller, the performance of the tension control system is greatly improved, the vibration amplitude of the tension output value is obviously reduced, the system can recover to a stable state rapidly, the final tension value can be stabilized near the target tension value well, and when the tension is suddenly changed, the system has high robustness, so that the response time of tension recovery is shortened.

The above is only the preferred specific embodiments of the present application, but the protection scope of the present application is not limited to this. Any changes or substitutions that may be easily conceived by those skilled in the art within the technical scope disclosed by the present application should be covered within the protection scope of the present application. Therefore, the protection scope of the present application should be subjected to the protection scope of the claims.

What is claimed is:

1. A tension control method of a multi-bundle winding equipment combined driving system, comprising the following steps:

S1: establishing a tension control system fractional order mathematical model according to an unwinding roll moment equation, a swing rod speed difference equation and a circuit equation, wherein a transfer function G(s) of the tension control system fractional order mathematical model is:

$$G(s) = G_a(s)G_b(s) = \frac{a}{bs^\alpha + 1} \cdot \frac{c}{s^\sigma}$$

in the formula, $G_a(s)$ is a fractional order transfer function of an unwinding roll module of a tension control system, $G_b(s)$ is a fractional order transfer function of a swing rod module of the tension control system, $$a = \frac{K_1}{BR + K_e K_t},$$

$K_t$ is a torque constant of a tension servo motor, B is a total friction coefficient converted to a motor shaft of the tension servo motor R is an equivalent resistance, $K_e$ is a back electromotive force coefficient, $$b = \frac{JR}{BR + K_e K_t}$$

J is a total rotational inertia, $$c = \frac{1}{2L_B},$$

$L_B$ is a half of a length of the swing rod, α is an introduced differential operator and 0<α<2, and σ is an introduced integral operator and 0<σ<2;

S2: introducing a time-varying parameter into fractional order PD control, and establishing a time-varying fractional order PID controller, wherein a transfer function $G_k(s)$ of the time-varying fractional order PID controller is:

$$G_k(s) = K_p + \frac{K_i}{s^\lambda} + K_d s^\mu$$

in the formula, $K_p$ is a proportionality coefficient of the time-varying fractional order PID controller, $K_i$ is an integral coefficient of the time-varying fractional order PID controller, $K_d$ is a differential coefficient of the time-varying fractional order PID controller, λ is an integral operator of the time-varying fractional order PID controller and 0<λ<2, and μ is a differential operator of the time-varying fractional order PID controller and 0<μ<2, a setting rule of the proportionality coefficient $K_p$, the integral coefficient $K_i$ and the differential coefficient $K_d$ of the time-varying fractional order PID controller is as follows:

$$K_p = m \cdot f^2(t), \; K_i = n \cdot f^3(t), \; K_d = p \cdot f(t)$$

in the formula, m, n and p are adjustable parameters and m, n, p ∈ [0, 100], f(t) is an adjustment formula, and an expression of the adjustment formula f(t) is as follows:

$$f(t) = \zeta \cdot (1 - e^{-t})$$

in the formula, ζ is determined according to a time behavior of a controlled system and has a value range of (1<ζ<100), and e is a natural constant;

S3: setting a target tension value r(t), inputting the target tension value r(t) and an unknown external interference Δd into the tension control system fractional order mathematical model, and outputting a real-time tension value y(t);

S4: calculating a difference between the target tension value r(t) and the real-time tension value y(t) and then inputting the difference into the time-varying fractional order PID controller, and outputting $u_{SC}$ by the time-varying fractional order PID controller;

S5: inputting an output value $u_{SC}$ of the controller and the unknown external interference Δd into the tension control system fractional order mathematical model, and outputting a real-time tension value y(t); and S6: repeating steps S4 and S5 until the real-time tension value y(t) output by the tension control system fractional order mathematical model approaches the target tension value r(t).

* * * * *